Nov. 27, 1928.

C. H. ALLEN

ADJUSTING NUT

Filed July 2, 1925

1,693,538

INVENTOR:
CARLOS H. ALLEN
BY
HIS ATTORNEY.

Patented Nov. 27, 1928.

1,693,538

UNITED STATES PATENT OFFICE.

CARLOS H. ALLEN, OF DETROIT, MICHIGAN, ASSIGNOR TO THE NEW DEPARTURE MANUFACTURING COMPANY, OF BRISTOL, CONNECTICUT, A CORPORATION OF CONNECTICUT.

ADJUSTING NUT.

Application filed July 2, 1925. Serial No. 41,232.

This invention relates to adjusting nuts and comprises all the features of novelty herein disclosed, as embodied, by way of example, in a pressed metal nut for adjusting the antifriction bearings of differential gearing.

When a thrust taking antifriction bearing, such as a ball bearing of the angular contact type, is in use, one of the race rings is frequently adjusted by a nut which abuts against the shouldered or thick end of the race ring and is threaded in or on a member which slidably supports the race ring. The induced end thrust may be considerable and the nut must counteract it. Although ball bearings require infrequent or no adjustment for wear, they are sometimes used to mount some other member which requires adjustment, such as the bevel ring gear of a differential which needs a fine adjustment with relation to the differential pinion. It is accordingly an object of the invention to provide a cheap, strong nut for effecting a fine adjustment of a bearing ring or the like. Another object is to provide a nut which can be pressed from thin sheet metal and yet have withal a sufficiently broad abutment face for withstanding the end thrust imposed on the bearing.

To these ends and also to improve generally upon devices of the character indicated my invention consists in the various matters hereinafter described and claimed.

In the drawings, Figure 1 is a central section of a differential gear housing with the improved nut applied to the bearings.

Figure 1:
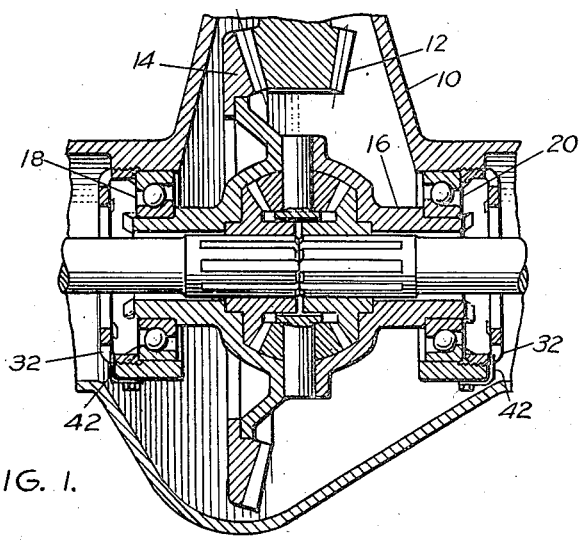
Figures 2, 3:
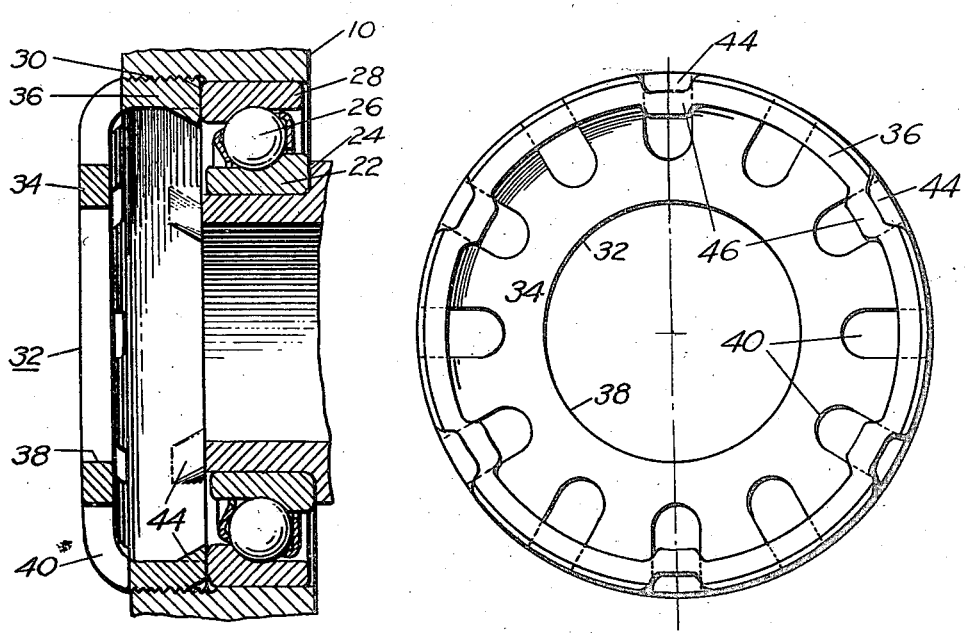
Figure 2 is a section of the nut and a bearing to a larger scale.
Figure 3 is an end elevation of the nut.

The numeral 10 designates a differential gear housing enclosing a differential pinion 12 which drives a ring gear 14 secured to a hub or carrier 16 mounted on adjustable angular contact ball bearings 18 and 20. The bearings are alike and have the same kind of adjusting nut. Each bearing comprises an inner race ring 22 abutting a shoulder 24 on the hub 16, a series of balls 26, and an outer race ring 28 which has a sliding fit in the housing 10. The housing has screw threads 30 cut in its bore at the outer side of each race ring 28 to receive the adjusting nut 32.

Each nut 32 comprises a flange plate or cup pressed from thin sheet metal, the body 34 of the plate being of skeleton form and its flange 36 having screw threads cut in its outer face to fit the threads 30. The body of the plate preferably has a central perforation 38 for the passage of a drive axle and a series of closely spaced radial slots 40 to selectively receive a locking lug 42 secured to the housing. Each nut can thus be locked in a plurality of positions to secure a fine adjustment of the race ring 28 and consequently of the ring gear 14. Near the end of the flange 36, a series of fingers 44 are pressed inwardly so that they incline towards the axis of the bearing and terminate in flat faces 46 which have a wide area abutting against the shouldered or thick end of the race ring 28. These faces 46 lie in the plane of the end of the flange 36 and take the thrust caused by the load imposed upon the angular contact bearing. Ordinarily the depth of the threads and the chamfer on the race ring would so reduce the area of contact that the load could not be sustained by a sheet metal nut.

Although the nut illustrated is specifically adapted for adjusting an outer race ring, it is within the scope of the invention to cut the threads on the inner face of the flange and press the abutment fingers outwardly so as to engage an inner race ring which is slidable on that member to which the nut is threaded. Other features are not essential to the invention, in its broader aspects.

I claim:

1. An adjusting nut comprising a flanged plate of thin sheet material, the flange having screw threads on one of its faces, and fingers pressed at intervals from the end of said flange and forming abutment faces for engagement with a bearing race ring; substantially as described.

2. An adjusting nut comprising a flanged plate of thin sheet material, the flange having screw threads on one of its faces, and a plurality of abutment fingers pressed from the end of said flange, said fingers being inclined with respect to the axis of the ring and having flat abutment faces at their ends for engagement with a bearing ring; substantially as described.

3. An adjusting nut comprising a flanged ring of thin sheet material, a flange having screw threads cut in its outer surface, and a plurality of fingers pressed radially inwards from said flange and having flat end abutment faces terminating in the plane of the end of the flange; substantially as described.

4. An adjusting nut comprising a flanged ring of thin metal, the body of the ring being substantially flat and the flange being substantially cylindrical and joined to the outer periphery of the body, said body having radial slots in its outer periphery extending through its junction with the flange, one of the faces of the flange having screw threads and the free end of the flange having a circular series of spaced abutment fingers inclined with respect to the axis of the ring with flat abutment faces at their ends at right angles to the axis of the ring, the fingers extending from the face of the flange opposite to the threaded face; substantially as described.

In testimony whereof I hereunto affix my signature.

CARLOS H. ALLEN.